(12) United States Patent
Hösel et al.

(10) Patent No.: US 7,203,567 B1
(45) Date of Patent: Apr. 10, 2007

(54) METHOD AND APPARATUS FOR ELECTRONICALLY CONTROLLING FIBER PROCESSING MACHINES, PARTICULARLY SPINNING PREPARATION MACHINES

(75) Inventors: Fritz Hösel, Mönchengladbach (DE); Dieter Wirtz, Erkelenz (DE)

(73) Assignee: Trützschler GmbH & Co. KG, Monchengladbach (DE)

( * ) Notice: Subject to any disclaimer, the term of this patent is extended or adjusted under 35 U.S.C. 154(b) by 336 days.

(21) Appl. No.: 09/708,967

(22) Filed: Nov. 9, 2000

(30) Foreign Application Priority Data

Nov. 11, 1999 (DE) ................................ 199 54 258

(51) Int. Cl.
*G06F 19/00* (2006.01)

(52) U.S. Cl. ................ 700/142; 700/122; 700/140

(58) Field of Classification Search .................. 700/21, 700/79, 122, 126, 130, 139, 140, 142, 82; 19/300; 57/264, 265; 714/8, 15
See application file for complete search history.

(56) References Cited

U.S. PATENT DOCUMENTS

| 4,094,133 | A | | 6/1978 | Furrer ........................ 57/264 |
|---|---|---|---|---|
| 4,353,667 | A | | 10/1982 | Mandl et al. |
| 4,369,550 | A | * | 1/1983 | Meile .......................... 19/240 |
| 4,404,710 | A | | 9/1983 | Wood |
| 4,521,847 | A | * | 6/1985 | Ziehm et al. .................. 700/79 |
| 4,607,351 | A | | 8/1986 | Gerber et al. ............... 365/228 |
| 4,631,930 | A | * | 12/1986 | Gutschmit et al. ............ 66/1 R |
| 4,665,686 | A | * | 5/1987 | Sumner et al. ............... 57/264 |
| 4,703,432 | A | * | 10/1987 | Muller ....................... 700/136 |
| 4,940,367 | A | | 7/1990 | Stäheli et al. |
| 5,100,073 | A | * | 3/1992 | Moehrke et al. ............ 242/470 |
| 5,143,485 | A | | 9/1992 | Faas et al. |
| 5,321,827 | A | * | 6/1994 | Lu et al. ........................ 712/32 |
| 5,371,709 | A | * | 12/1994 | Fisher et al. ................ 365/226 |
| 5,394,334 | A | * | 2/1995 | Simon ........................ 700/139 |
| 5,515,266 | A | * | 5/1996 | Meyer .......................... 700/79 |
| 5,602,987 | A | * | 2/1997 | Harari et al. .................. 714/8 |
| 5,642,091 | A | | 6/1997 | Coenen et al. .............. 340/310 |

(Continued)

FOREIGN PATENT DOCUMENTS

DE 39 39 789 6/1991

(Continued)

OTHER PUBLICATIONS

Wray, William C. and Greenfield, Joseph D., Using Microprocessors and Microcomputers, 1994, Prentice-Hall, Third Edition, p. 49.*

(Continued)

*Primary Examiner*—Alexander Kosowski
(74) *Attorney, Agent, or Firm*—Venable LLP; Robert Kinberg; Steven J. Schwarz

(57) ABSTRACT

An apparatus for electronically controlling a fiber processing machine includes at least one plug-in module group and at least one memory for receiving and storing data. A non-volatile memory is disposed physically apart from the plug-in module group whereby the data inputted in the memory are not lost upon switching off a power supply to the apparatus or upon replacing at least one plug-in module group and whereby upon resuming operation of the apparatus the data may be read and further processed.

9 Claims, 2 Drawing Sheets

U.S. PATENT DOCUMENTS

| | | | | |
|---|---|---|---|---|
| 5,710,708 | A | | 1/1998 | Wiegand .................... 700/139 |
| 5,781,796 | A | * | 7/1998 | Lee ................................ 710/8 |
| 5,796,635 | A | * | 8/1998 | Dammig .................... 702/170 |
| 5,801,949 | A | * | 9/1998 | Raasch et al. .............. 700/130 |
| 5,924,374 | A | * | 7/1999 | Mori et al. ............ 112/470.02 |
| 6,052,764 | A | * | 4/2000 | Mogul ........................ 711/162 |
| 6,194,856 | B1 | * | 2/2001 | Kobayashi et al. ......... 318/432 |
| 6,208,542 | B1 | * | 3/2001 | Wang et al. ................... 365/45 |
| 6,295,481 | B1 | * | 9/2001 | Price .......................... 700/136 |
| 6,314,381 | B1 | * | 11/2001 | Johansson ................... 702/104 |
| 6,401,163 | B1 | * | 6/2002 | Kondo et al. ............... 711/100 |
| 2002/0124354 | A1 | | 9/2002 | Pferdmenges et al. |

FOREIGN PATENT DOCUMENTS

| | | |
|---|---|---|
| DE | 43 04 962 | 10/1993 |
| DE | 42 29 285 | 3/1994 |
| DE | 44 22 523 | 1/1996 |
| DE | 195 05 023 | 8/1996 |
| EP | 0 027 432 | 4/1981 |
| EP | 0 161 344 A1 | 11/1985 |
| EP | 628647 A1 * | 12/1994 |
| GB | 2 130 399 | 5/1984 |
| GB | 2 169 322 A | 7/1986 |
| JP | 2001181934 A * | 7/2001 |

OTHER PUBLICATIONS

William C. Wray, Joseph D. Greenfield, Using Microprocessors and Microcomputers the Motorola Family 1994, Prentice-Hall, Inc., Third Edition, p. 449.*

* cited by examiner

PRIOR ART

METHOD AND APPARATUS FOR ELECTRONICALLY CONTROLLING FIBER PROCESSING MACHINES, PARTICULARLY SPINNING PREPARATION MACHINES

CROSS REFERENCE TO RELATED APPLICATION

This application claims the priority of German Application No. 199 54 258.9 filed Nov. 11, 1999, which is incorporated herein by reference.

BACKGROUND OF THE INVENTION

This invention relates to a method and an apparatus for electronically controlling fiber processing machines, such as spinning room machines, particularly spinning preparation machines. The apparatus has at least one memory for inputting data and at least one plug-in module group.

Electronic machine controls, may, among others, detect and store various information concerning the machines and possible operational conditions (such as structural conditions, types, etc.). To prevent a loss of stored important data, storage media such as battery-buffered RAM-modules, EAROMS, EEPROMS or similar components are used. In a control system which, as a rule, is composed of a plurality of different plug-in module groups, such memories are positioned on one or several of such module groups. It is a problem encountered in such arrangements that when the module groups are replaced, for example, in case of a defect, they are replaced together with the memories and thus the stored information is irretrievably lost. An electronic recovery of the data is possible only with a prohibitive expense and outlay and with the required know-how.

An up-to-date fiber processing and finishing machine, particularly a spinning room machine, has a number of possible structural operating conditions (such as operating frequencies of 50 or 60 Hz). This type of information, on the one hand, has to be stored in such a secure manner that it is preserved for the lifetime of the machine and, on the other hand, if a re-building or a change of the structural condition occurs, it can be adapted accordingly. To ensure that even when all module groups are replaced such information is not lost, the following conventional procedure is observed:

1. For each information only two permitted condition exists, namely, "yes" or "no" corresponding to a logic 1 or 0 or, respectively, +24 V or 0 V.

2. For each possible information a digital input is reserved in the electronic control apparatus.

3. Dependent on the structural condition, only a +24 V or a 0 V signal is applied to the digital input, that is, such an input is permanently wired. As a rule, such wiring is effected by means of plug connectors associated with the respective module group.

If such a module group has to be replaced, for example, in case of a defect, the plugs are pulled off, and the new module groups are put in place and the plugs are again inserted. The information has not changed because of such replacement.

Particularly in case of complaints or maintenance work the hours of past operation have to be known. To ensure that such information cannot be tampered with, generally electromechanical counters for the elapsed operating hours are utilized. Such counters are independent from any control operation and the information is preserved even in case of power failure. It is a particular disadvantage of such an arrangement, however, that, on the one hand, by utilizing such devices additional expenditures are encountered and, on the other hand, the information is only visually readable. Also, they cannot be electrically evaluated and furthermore, they may be tampered with by the customer by disconnecting and reconnecting.

SUMMARY OF THE INVENTION

It is an object of the invention to provide an improved apparatus of the above-outlined type from which the discussed disadvantages are eliminated and which, in particular, is of simple construction.

This object and others to become apparent as the specification progresses, are accomplished by the invention, according to which, briefly stated, the apparatus for electronically controlling a fiber processing machine includes at least one plug-in module group and at least one memory for receiving and storing data. A non-volatile memory is disposed physically apart from the plug-in module group whereby the data inputted in the memory are not lost upon switching off a power supply to the apparatus or upon replacing at least one plug-in module group and whereby upon resuming operation of the apparatus the data may be read and further processed.

By virtue of the measures according to the invention, an economical apparatus is provided which offers the possibility to store important information in such a manner that while the information is at any time changeable, upon replacement of any or all plug-in module groups the information is not lost and no mechanical replacement of the inserted memory modules is necessary.

The invention furthermore encompasses a method for storing and reading data, such as data relating to the machine and its operating states, particularly by means of an apparatus according to the invention. According to the method operational data are stored in the memories cyclically or as a function of determined processes or conditions in such a manner that in case of a failure of the supply voltage and/or upon replacement of the plug-in module groups no information loss will occur.

DESCRIPTION OF THE PREFERRED EMBODIMENTS

Figure 1:
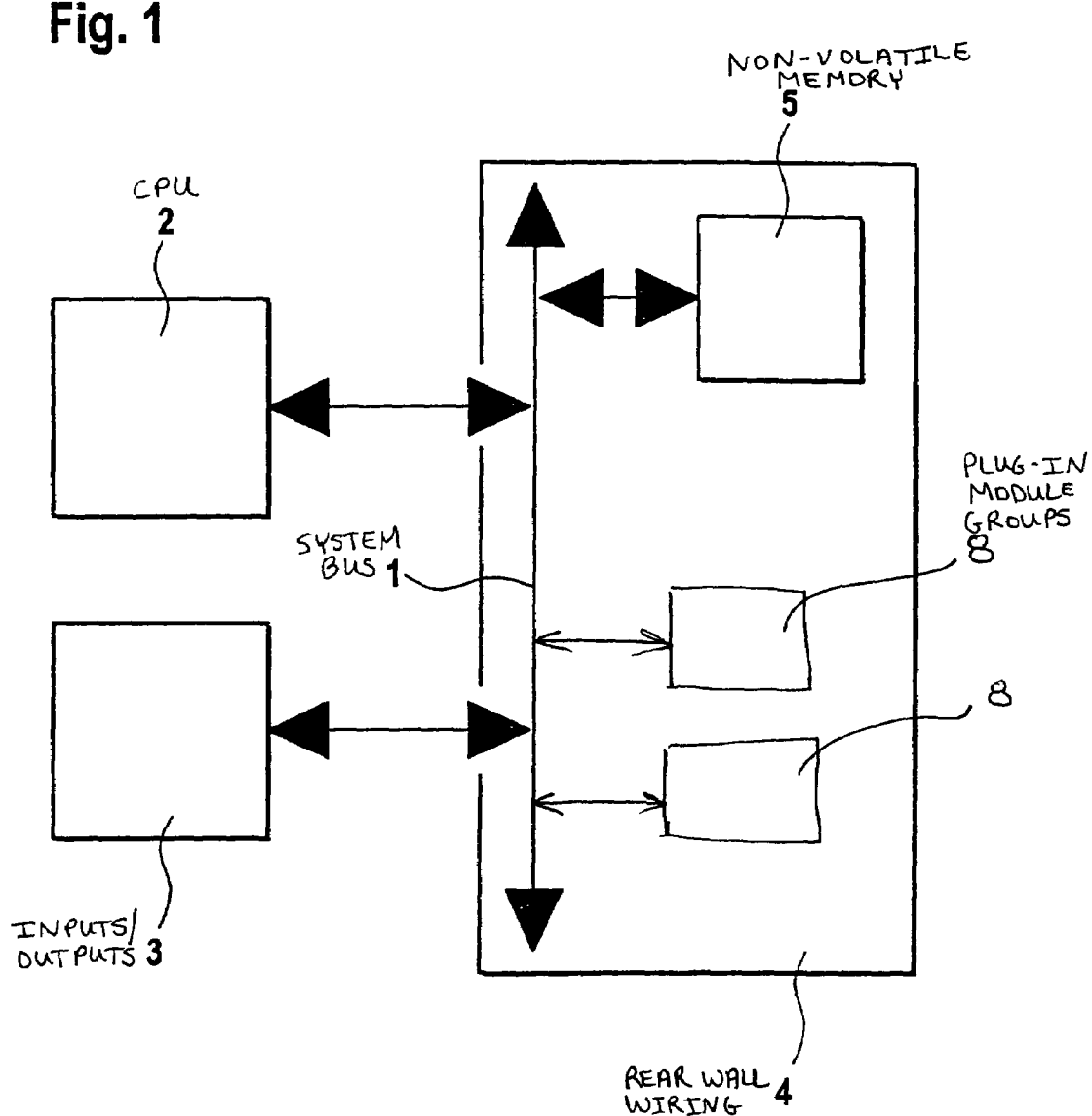
FIG. 1 is a block diagram of the apparatus according to the invention.

Turning to FIG. 1, the apparatus according to the invention has a system bus 1 which is connected with a central processing unit (CPU) 2 (microprocessor) as well as with inputs and outputs 3. The system bus is located on the rear wall wiring 4, such as a circuit board, and is connected with a non-volatile data memory 5. It is of importance that data can be inputted in a non-volatile, writable and erasable memory 5 which is not situated on one of the plug-in module groups 8 of the control system, that is, which is physically apart therefrom, so that a physical manipulation of any plug-in module group 8 (such as removal from the apparatus) will not affect the memory 5. Preferably, the memory 5 is at least one serial EEPROM which is situated on the rear wall wiring 4 and which is connected via the system bus 1 at least with the CPU 2 and may exchange data therewith.

Figure 2:
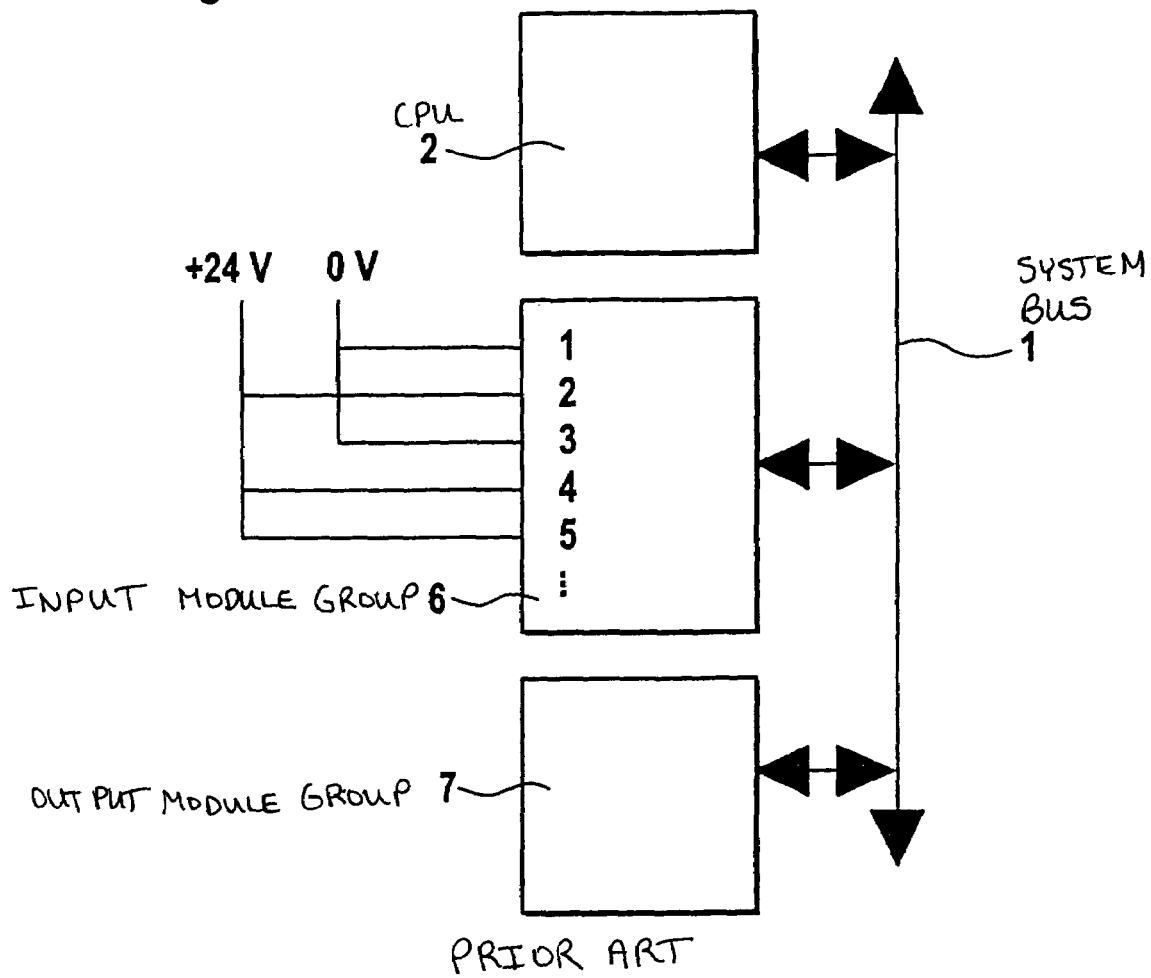
FIG. 2 is a block diagram schematically showing a known method of determining operational conditions for five different types of information.

FIG. 2 schematically shows the earlier-noted conventional way of determining the structural condition for five different types of information. The reference numeral 6 designates the input module group and the reference numeral 7 designates the output module group.

Figure 3:
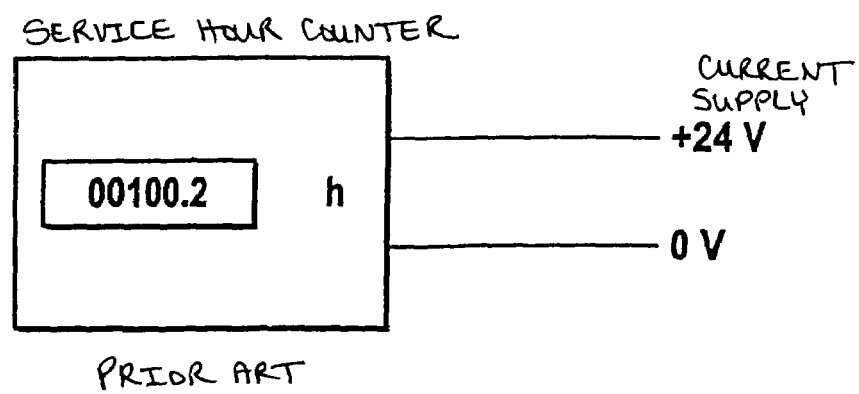
FIG. 3 is a block diagram showing a conventional service hour counter with conventional current supply.

FIG. 3 schematically shows a known counter for elapsed operating hours actuated with a conventional current supply.

Spinning preparation machines are particularly bale openers, mixers, cleaners, card feeders, carding machines and draw frames for processing fiber material, for example, cotton or chemical fibers. It is to be understood, however, that the invention may be used in connection with other spinning machines, for example, ring spinning machines or open end spinning machines, flyers, combing machines, roller card units and the like.

It will be understood that the above description of the present invention is susceptible to various modifications, changes and adaptations, and the same are intended to be comprehended within the meaning and range of equivalents of the appended claims.

What is claimed is:

1. An apparatus for electronically controlling a fiber processing machine, comprising:
    a system bus;
    at least one plug-in control module adapted to connect to the system bus; and
    at least one memory connected to the system bus for receiving and storing data;
    the memory being a non-volatile, electrically erasable and programmable memory, disposed physically apart from said at least one plug-in control module, such that when a supply voltage to the apparatus is shut down, the data are not lost and can be read further without additional equipment when the apparatus is started up again,
    wherein the fiber processing machine comprises a spinning preparation machine, and said memory contains said data, which comprises an indication of elapsed operating hours of the fiber processing machine.

2. The apparatus as defined in claim 1, wherein said memory is a serial memory.

3. The apparatus as defined in claim 1, wherein said memory is a RAM including means for receiving a buffer voltage.

4. The apparatus as defined in claim 1, further comprising a circuit board; said memory being positioned on said circuit board.

5. The apparatus as defined in claim 1, further comprising a central processing unit electrically connected to said memory.

6. An apparatus for electronically controlling a fiber processing machine, comprising:
    a system bus;
    a plurality of plug-in control modules adapted to connect to the system bus; and
    at least one memory connected to the system bus for receiving and storing data;
    the memory being a non-volatile, electrically erasable and programmable memory, disposed physically apart from any of said plurality of plug-in control modules, such that when a supply voltage to the apparatus is shut down, the data are not lost and can be read further without additional equipment when the apparatus is started up again,
    wherein the fiber processing machine comprises a spinning preparation machine, and said memory contains said data, which comprises an indication of elapsed operating hours of the fiber processing machine.

7. A method of electronically controlling a fiber processing machine, including a system bus, plug-in control modules adapted to connect to the system bus, and at least one memory connected to the system bus for receiving and storing data, the method comprising:
    applying the data to the memory, the memory being a non-volatile, electrically erasable and programmable memory, disposed physically apart from any of said plug-in control modules, such that when a supply voltage to the apparatus is shut down, the data are not lost and can be read further without additional equipment when the apparatus is started up again,
    wherein the fiber processing machine comprises a spinning preparation machine, and said data comprises an indication of elapsed operating hours of the fiber processing machine.

8. The method as defined in claim 7, further comprising the step of serially exchanging data between said plug-in control module and said memory.

9. The method as defined in claim 7, wherein said step of applying data includes the step of applying data to said memory relating to one of a manufacture and a startup of the fiber processing machine.

* * * * *

UNITED STATES PATENT AND TRADEMARK OFFICE
CERTIFICATE OF CORRECTION

| | | |
|---|---|---|
| PATENT NO. | : 7,203,567 B1 | Page 1 of 1 |
| APPLICATION NO. | : 09/708967 | |
| DATED | : April 10, 2007 | |
| INVENTOR(S) | : Hösel et al. | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (336) days Delete the phrase "by 336 days" and insert -- by 320 days--

Signed and Sealed this

Second Day of October, 2007

JON W. DUDAS
*Director of the United States Patent and Trademark Office*